July 12, 1932.  W. H. WELCH  1,866,738
TESTING APPARATUS FOR MOTOR VEHICLES
Original Filed July 21, 1928   2 Sheets-Sheet 1
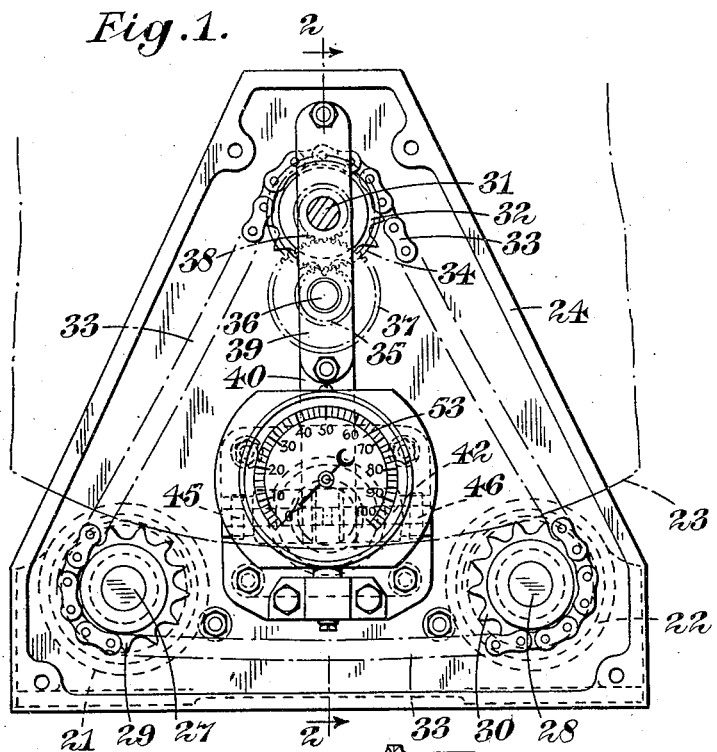
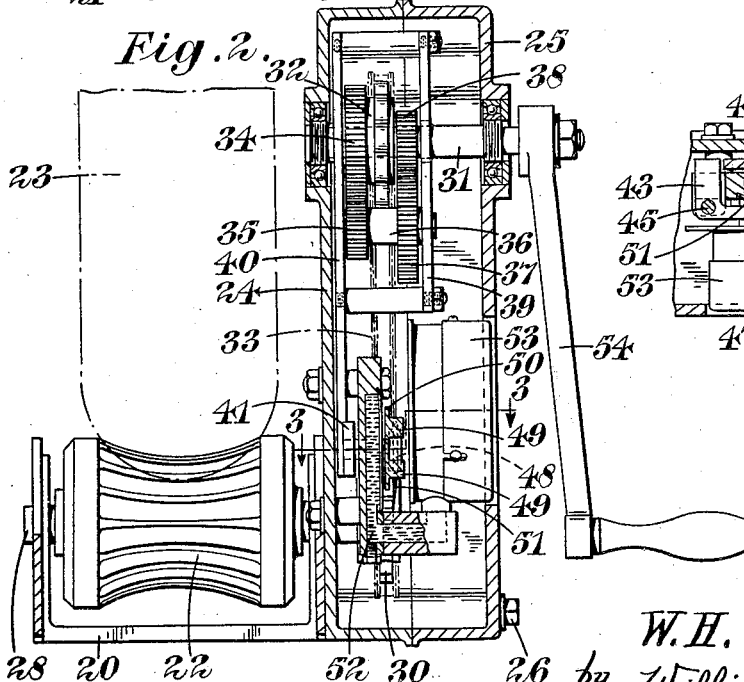
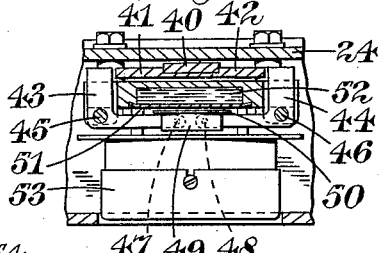
Inventor
W. H. Welch
by Wilkinson & Mawhinney
Attorneys.

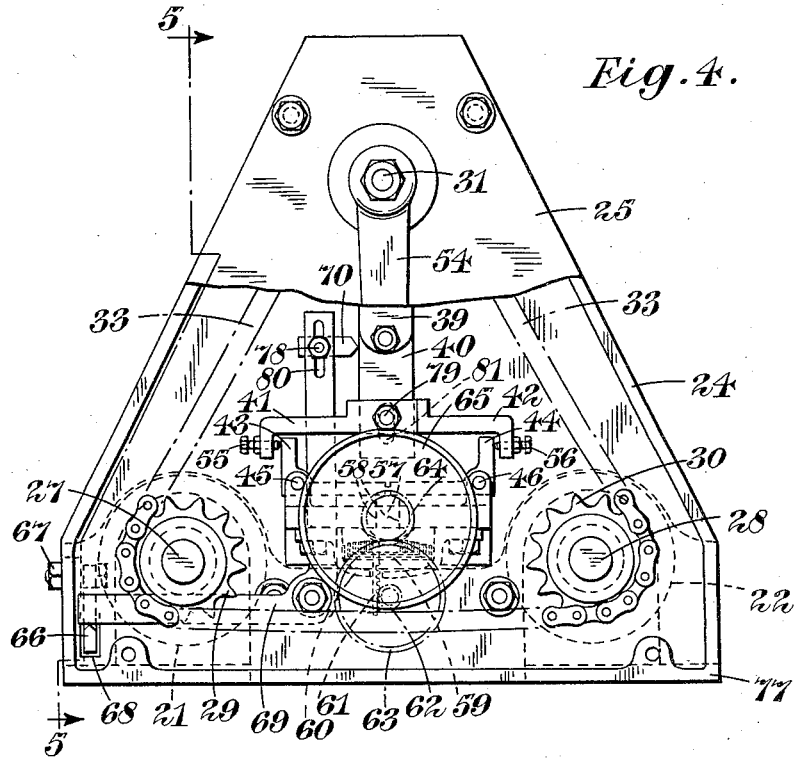
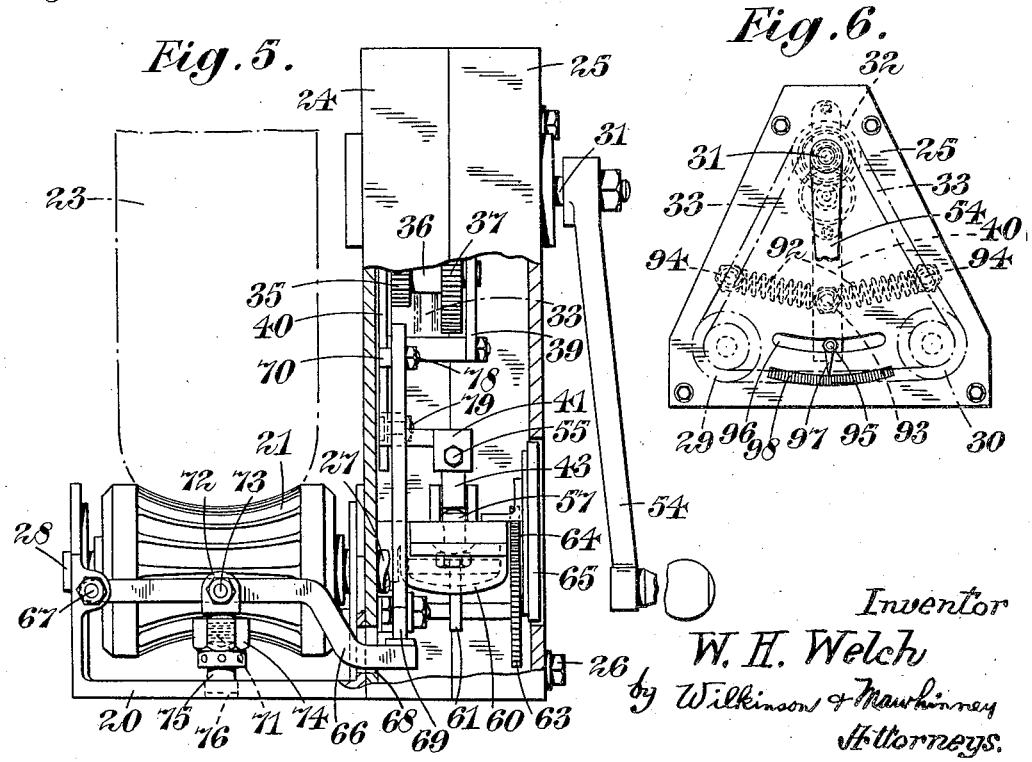

Patented July 12, 1932

1,866,738

UNITED STATES PATENT OFFICE

WALTER HENRY WELCH, OF BRISTOL, ENGLAND

TESTING APPARATUS FOR MOTOR VEHICLES

Original application filed July 21, 1928, Serial No. 294,535, and in Great Britain December 30, 1927. Divided and this application filed July 11, 1931. Serial No. 550,234.

The present invention relates to improvements in testing apparatus for motor vehicles and is a division of my application entitled Testing apparatus for motor vehicles, Ser. No. 294,535, filed July 21, 1928, which has resulted in Patent No. 1,846,170, granted Feb. 23, 1932.

This invention is for improvements in testing apparatus for motor vehicles whereby the efficacy of the brakes can be measured; the apparatus may also be used for measuring the power available for driving the vehicle. The ability to test the brakes of a vehicle is of importance, particularly in regard to the setting or adjustment of the brakes so that they are applied with equal force to both steering wheels or to both driving wheels and in the correct ratio as between driving wheels and steering wheels. It is a particular object of the present invention to provide an apparatus which can be constructed in a simple form for hand operation and can be used in places where external power for driving it, such as, for example, a generating set and connections for actuating an electric motor, are not available. A further object is to provide such a construction that the vehicle is tested with its wheels in a natural or normal position, bearing the weight of the vehicle. If a wheel of a vehicle is jacked up to render it available for testing, the distribution of the stresses and the clearances in the wheel, axle, springs and associated parts are quite different from the normal running conditions so that a true reading cannot be obtained unless the wheel is supporting the vehicle in the ordinary way.

A device, according to the present invention, for testing the power applied to the road wheels of a motor vehicle comprises a pair of rollers whereon a road wheel can stand, one or both of which rollers can be driven, means for measuring the torque applied thereto and means for measuring the load on any wheel of the vehicle.

The desirable braking effort for each road wheel is proportionate to the load on that wheel; hence, it follows that if the load on any wheel of the vehicle is known the proper braking force for that wheel can be determined. Another object of the present invention is to provide means whereby the said load may be readily ascertained. The load-measuring means and the torque-measuring means may be both operatively connected to a common indicating dial.

For a more complete understanding of the invention, several constructions in accordance therewith will now be described, by way of example, with reference to the accompanying drawings in which:—

Figure 1 is a front elevation of one construction with its cover plate removed;

Figure 2 is a sectional elevation on the line 2—2 of Figure 1;

Figure 3 is a part-sectional plan on the line 3—3 of Figure 2;

Figure 4 is a similar view to Figure 1 of a modification of the apparatus;

Figure 5 is a sectional elevation on the line 5—5 of Figure 4;

Figure 6 is a diagrammatic front elevation of a further modification.

Like reference numerals indicate like parts in the various figures of the drawings.

In the construction shown in Figures 1 to 3 inclusive, which is similar to that described in the specification of my United States application No. 294,535, a trough-shaped member 20 has a pair of rollers 21, 22 mounted in it, one towards each end. These rollers may be cylindrical but are preferably hollowed in longitudinal cross-section to accommodate the tyre of the wheel 23 indicated in chain-lines in Figures 1 and 2. The rollers may be roughened, ribbed or perforated to provide good frictional engagement with the tyre. On one side of the trough 20 there is mounted a triangular upstanding casing formed in two parts 24, 25 adapted to be secured together by bolts such as are indicated at 26. Each of the roller shafts 27, 28 extends into the said casing and carries a chain sprocket 29, 30 respectively. At the apex of the triangular casing there is loosely mounted on a shaft 31 another chain sprocket 32 and a single chain 33 passes round the three sprockets. If the two rollers are operative to resist the braking force, the chain 33 connects all the sprockets as above described, but if desired the chain 33 may connect only the sprocket 32 and one of the sprockets 29, 30, one of the rollers 21, 22 being an idler. The chain sprocket 32 is coupled to a gear wheel 34 also loose on the shaft 31 which engages a pinion 35 which is loosely mounted on a secondary shaft 36 and is coupled to a gear wheel 37 also loose on the shaft 36. The gear wheel 37 meshes with a pinion 38 fixed to the shaft 31, the whole constituting a reduction gear. The secondary shaft 36 is carried by radial arms 39, 40 and the arm 40 is extended downwardly towards the base of the casing. At its lower end, the arm 40 carries laterally projecting arms 41, 42, which engage each one arm of a pair of bell-crank levers 43, 44, these levers being pivoted about vertical axes 45, 46 situated to the front of the arm 40. The other arms of the bell-crank levers 43, 44 are directed towards one another and are connected by pins 47, 48 respectively to lugs 49 on a plate 50 adapted to bear against a flexible diaphragm 51 forming one wall of a chamber 52 filled with oil or other suitable liquid.

The parts are so disposed that movement of the depending arm 40 aforesaid in one direction or the other tends to rock one or other of the bell-cranks 43, 44 so that its other arm presses the plate 50 upon the diaphragm 51 and is thereby restrained from further movement. It will be understood that the other arms of the bell-cranks 43, 44 are slotted to permit the necessary movement relatively to the pins 47, 48 when the said bell-crank levers are rocked. The pressure exerted on the diaphragm is measured by means of a pressure gauge 53 in communication with the interior of the chamber 52.

It will be seen that when a vehicle is arranged with one of its driving wheels on the rollers 21, 22 or each of its driving wheels on a separate apparatus, a drive can be imparted to the driving wheels by means of a handle 54 operating through the gearing and chain drive 33 to the rollers 21, 22. When the brakes are applied additional effort is required to turn the wheels, the reaction to this driving effort at the reducing gear being resisted by the oil in the closed chamber 52. The reaction is measured by the pressure gauge 53 so that a reading of the absolute braking effort is obtained.

The pressure gauge 53 may be calibrated to show the desirable braking effort for different weights of vehicles or this information may be read from a chart.

In the construction shown in Figures 4 and 5, a downwardly extending arm 40 aforesaid carries laterally projecting arms 41, 42, in each of which an adjusting screw 55, 56 is mounted. The said screws engage each one arm of a pair of bell-crank levers 43, 44 which are pivoted about their horizontal axes 45, 46 respectively. The other arms of these bell-crank levers are directed towards one another and bear on the upper end of a T-shaped presser 57 which is adapted to slide vertically between guides 58.

The lower end of the presser 57 bears against a conical spiral spring 59 formed of rectangular-section material mounted in a suitable casing 60. The underside of said spring is connected to a vertical bar 61 provided with rack teeth which mesh with a pinion 62 fixed to a shaft to which is also secured a gear wheel 63. This wheel meshes with a gear wheel 64 fixed to an axle carrying the pointer of an indicating dial 65. The mechanism just described will act in the same manner as that described with reference to Figures 1 to 3 and by adjusting the screws 55, 56, the same reading can be obtained for either direction of rotation of the main shaft 31.

The apparatus shown in Figures 4 and 5 incorporates means for measuring the load on a road wheel which means will now be described. It will be obvious that, if desired, this load-measuring means may be provided in the construction shown in Figures 1 to 3.

The load-measuring means comprises a lever 66 which is disposed to one side of the wheel-supporting roller 21 and is pivoted at one end to the side wall of the trough 20, as shown at 67. The other end of the pivoted lever 66 extends through an aperture 68 in the opposite side wall of the trough 20 and the rear wall of the part 24 of the triangular casing. This end of the pivoted lever has a knife-edge which bears against a substantially horizontal arm of a bell-crank lever 69, the other arm of which is substantially vertical and carries a knife-edge 70 which bears against the aforesaid downwardly-extending arm 40 of the torque-measuring means. Approximately at the mid-point of its length, the pivoted lever 66 is fixed to a short vertical screw-threaded rod 71 by means of a forked head 72 on the latter and a bolt and nut 73. The screw-threaded rod 71 is engaged by a nut member 74 having a stem 75 adapted to project through a hole 76 in the base of the trough 20.

In order to ascertain the load on the wheel, the wheel is supported on the rollers 21, 22 and the nut member 74 is rotated for example, by a tommy-bar, so that its stem 75 bears against the floor or ground. Continued rotation of the nut member will raise the pivoted lever 66, the latter will cause the bell-crank lever 69 to rock and the downwardly extending arm 40 to swing so that the pressure 57 will press upon the conical spring 59. The pressure on said spring will be indicated on the dial 65 and when the pressure is equal to the load on the wheel further turning of the nut 74 will cause the apparatus to tilt as a whole about the outer lower edge 77 (see Figure 4) of the triangular casing as a fulcrum.

It will be appreciated that the various pivoted levers and arms may be so arranged and proportioned that the dial 65 will indicate the desired proportion of the load on the wheel. This reading may be given in any desired units and the knife edge 70 on the bell-crank lever 69 and the downwardly-extending arm 40 may be adjustably mounted so that they can be set, for example, by means of bolts and nuts 78, 79 engaging slots 80, 81 in the vertical arm of the bell crank-lever 69 and in the arm 40 respectively.

Preferably, the mechanism is designed so that the maximum braking force which can be used with a normal coefficient of friction on the road gives the same reading on the dial as the weight of the vehicle. Thus, the provision and use of charts showing the desirable braking effort for different weights of vehicles is obviated since it is only necessary to ascertain the load on the wheel and adjust the brakes to give the same reading.

Instead of turning the apparatus by hand, a small electric motor may be provided for this purpose and, since such motors usually run at high speed, it is desirable to take the drive from the motor through a worm gear to the reduction gearing described above. It will be appreciated that, owing to the large ratio of reduction, only a small motor is necessary to turn the road wheels even when the brakes are strongly applied.

Instead of using the pressure gauge 53 to measure the torque, the depending arm 40 of the reduction gear may be spring-controlled as shown diagrammatically in Figure 6. In this arrangement, two helical springs 92 are provided whereof adjacent ends are connected to the depending arm 40 as shown at 93 and the other ends are secured to the casing as shown at 94. The lower end of the arm 40 carries a stud 95 projecting through a slot 96 in the part 25 of the casing and which has at its outer end a pointer 96 adapted to move over a scale 98. When the arm 40 moves from its central position it compresses one and stretches the other of the springs 92, variation in the length of the springs being a measure of the torque applied.

I claim:—

In a device as specified, a roller support adapted to receive a wheel of a motor vehicle thereon, gear means connected to the roller support for turning the same to rotate the wheel, an indicator, yieldable connecting means between the indicator and the gear means for operation by the latter upon resistance to turning to actuate the indicator and measure the torque applied to the wheel, and weighing means between the roller support and said connection for operating the latter by the weight on the support and showing such weight on the indicator.

In testimony whereof I affix my signature.

WALTER HENRY WELCH.